United States Patent [19]

Frungel et al.

[11] 3,721,172
[45] March 20, 1973

[54] CAPPING SHUTTER WITH EXPLOSIVE CHARGE OF CARBON POWDER

[75] Inventors: Frank Frungel; Horst Lohse, both of Hamburg, Germany

[73] Assignee: Impulsphysik GmbH, Hamburg, Germany

[22] Filed: Nov. 24, 1970

[21] Appl. No.: 92,440

[52] U.S. Cl..................................95/53, 350/266
[51] Int. Cl..............................G03b 9/08, G02f 1/28
[58] Field of Search .......95/53 R, 53 E, 11; 350/160, 350/266, 267

[56] References Cited

UNITED STATES PATENTS

| | | | |
|---|---|---|---|
| 3,342,540 | 9/1967 | Abegg et al. | 350/267 |
| 3,517,197 | 6/1970 | Poeschl et al. | 95/11 |
| 3,278,740 | 10/1966 | Madansky | 240/2.1 |
| 3,133,485 | 5/1964 | Cast et al. | 350/266 |
| 2,470,139 | 5/1949 | Campbell | 350/160 |

*Primary Examiner*—Joseph F. Peters, Jr.
*Attorney*—Michael S. Striker

[57] ABSTRACT

A shutter comprises a frame of elastomeric material which bounds an opening for the passage of light. A pair of parallel transparent plates are sealingly accommodated in the frame exteriorly across the opening and define between themselves and with the frame an internal chamber. One or more shutter-closing units are embedded in the frame and each include a housing or shell having an open side communicating with the camber, a charge of carbon powder accommodated in the open shell with a frangible layer extending across the open side to retain the carbon powder in the shell until the time of operation, and an explosive charge which can be triggered electrically and which blows the carbon powder into the chamber to thereby close the shutter, that is prevent further passage of light through the opening.

22 Claims, 5 Drawing Figures

PATENTED MAR 20 1973　　　　　　　　　　　3,721,172
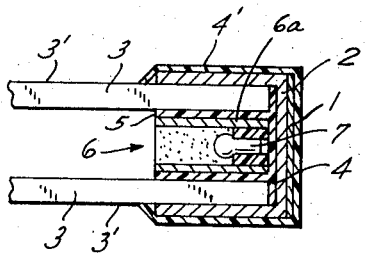
FIG.1
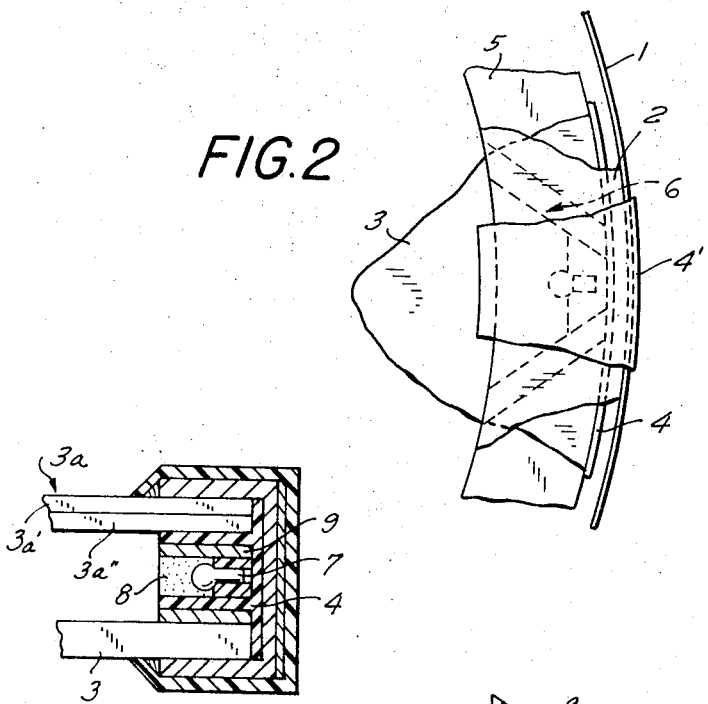
FIG.2
FIG.4
FIG.3
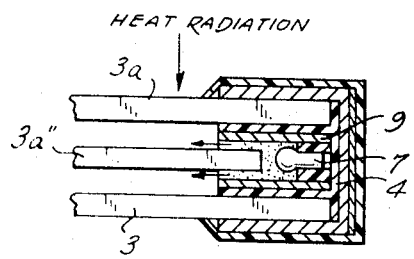
HEAT RADIATION
FIG.4a
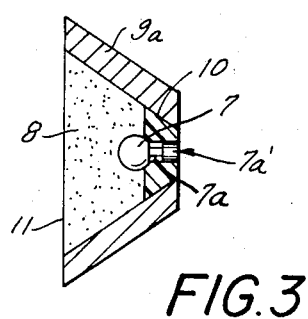
INVENTOR
FRANK FRUNGEL
BY HORST LOHSE
ATTORNEY

CAPPING SHUTTER WITH EXPLOSIVE CHARGE OF CARBON POWDER

BACKGROUND OF THE INVENTION

The present invention relates generally to a shutter, and more particularly to a photographic shutter. Still more particularly the present invention relates to a so-called "capping" shutter, that is a shutter which closes a passage for light permanently, rather than temporarily.

There are applications where it is imperative for a shutter to completely close a light passage of relatively large area—for instance on the order of 30 – 200 cm$^2$—in very short times. One such application is to protect the human eye from the damaging effects of spontaneously occurring strong or very strong radiation. Another application is for instance when an early phase of a combustion process is to be photographed before the stronger radiation of the main phase of the combustion process begins and at which time the shutter is to close. Still another application is the photography of nuclear explostions.

With these requirements in view, high-speed shutters of the type here under discussion—namely so-called "capping" shutters—have already been developed. One such shutter is a carbon-injection shutter utilizing two thick parallel glass plates which are sealed at their edges by seals of suitable material, and which are surrounded at their edges by a very strong metallic frame. In the space defined between the spaced-apart glass plates and the metallic frame small explosions are triggered when it is desired to close the shutter, for instance by detonating explosive charges containing minute quantities of explosives, such as nitro-pentan(Np) and silver azide, or lead trizinate. These explosions serve to blow into the chamber or space a charge of carbon powder which normally adheres to the inner surfaces of the glass plates. To increase the speed with which the shutter "closes" several such charges can be detonated simultaneously and each will then blow a quantity of carbon powder into the chamber. This shutter can subsequently be disassembled, the carbon powder adhering to the glass plates be removed, new carbon and explosive charges be installed, and the shutter be assembled for another use.

However, this basically operable construction suffers from certain disadvantages. In particular, the pressures resulting from triggering of the explosives require that the metal frame of the shutter must be made very heavy and strong, and that the glass plates must be very thick, to be able to withstand the explosive pressure in the interior of the chamber. Also, it is necessary to provide special seals to make the chamber pressure-tight and vacuum-tight to the maximum possible extent. Although despite these special measures such carbon shutters are not excessively expensive, due to their basically simple construction, they are nevertheless still far too expensive to be made for a single use followed by discarding.

SUMMARY OF THE INVENTION

It is, accordingly, an object of the present invention to overcome the aforementioned disadvantages.

More particularly it is an object of the present invention to provide an improved capping shutter of the type under discussion.

Still more specifically it is an object of the present invention to provide an improved carbon-injection capping shutter which is lighter in weight than heretofore possible, and which is so inexpensive to make that it can be used once and thereupon discarded.

A concomitant object of the invention is to provide such an improved carbon-injection capping shutter which is capable of closure times below 100 μs.

In pursuance of the above objects, and others which will become apparent hereafter, one feature of the invention resides in a shutter which, briefly stated, comprises a frame of elastomeric material bounding an opening for the passage of light. A pair of at least substantially parallel transparent plates sealingly accommodated in this frame extending across the opening and defining between themselves an internal chamber. There is further provided means for terminating the passage of light through the opening and the plates, and this means comprises at least one unit accommodated in the frame and including a charge of carbon powder and injecting means operable for injecting the carbon powder at high speed into the chamber.

Preferably the elastomeric material of the frame is silicon rubber, but another resiliently yieldable elastomeric material may also be used. It is also preferable that the plates be made not of glass but of synthetic plastic material, although glass can also be employed.

By constructing a shutter in accordance with the present invention the structure of the shutter is capable of resiliently yielding to the pressures developing in the interior of the shutter chamber, so that the shock pressure of the explosion is substantially reduced. This of course makes it possible to use lighter-weight and lesser-strength construction where the thickness of the various components and their weight can be significantly reduced. In addition to saving weight and material, this also reduces the space requirements for the novel shutter.

Furthermore, the fact that the chamber is now in effect resiliently yieldable, because the components surrounding and defining the chamber are so yieldable, it is possible to employ in the shutter according to the present invention explosive charges which are substantially stronger than those which could heretofore be used, whereby significantly shorter exposure times can be achieved.

The explosive charges are triggered electrically and according to a further concept of the invention it is advantageous to embed the electrical conductors or wires which are connected with the explosive charges, in the material of the frame itself. In fact, the conductors may in turn be connected with a connector, whether it be of the male or female type, which itself can be embedded in the frame so that the shutter can in a very simple manner be connected with an external source of electrical energy by plugging into the connector a mating connector which is conductively associated with the external source of electrical energy. It will be appreciated that the embedding of the connector and the wires eliminates any necessity for subsequent manual installation and also protects these components against possible damage prior to use. Also, where it was conventional to screwthreadedly secure the explosive charges in the frame of the prior-art shutter construction, the present invention eliminates this need because the charges are pressure-tightly embedded in the frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary somewhat diagrammatic cross-section through the shutter according to the present invention;

FIG. 2 is a partially-broken away top-plan view of the fragmentary showing in FIG. 1;

FIG. 3 is an axial section through an injecting unit for use in the shutter according to the present invention;

FIG. 4 is a view similar to FIG. 1 but illustrating a further embodiment of the invention; and FIG. 4a is a view similar to FIG. 4 but of yet another embodiment of the invention.

DESCRIPTION OF THE PREFERRED EMBODIMENTS

Discussing now the drawing in detail, and firstly the embodiment illustrated in FIGS. 1 and 2, it will be seen that the shutter disclosed therein comprises a pair of transversely spaced at least substantially parallel plates 3 which may be of glass but preferably made of transparent synthetic plastic material, for instance of the type available under the trademarks "Plexiglas" or "Macronon". In the illustrated embodiment it is assumed that the plates 3 are of circular configuration, with the entire shutter being also circular. That being the case it will be appreciated that in FIGS. 1 and 2 the disclosed shutter construction should be considered as being circular, so that in FIG. 1 for instance a mirror-symmetrical portion of the shutter should be imagined as being located at the left-hand side of that Figure. Of course, the illustrated section through the right-hand side of the shutter is believed to be adequate for an explanation and understanding of the invention. Naturally the shutter could be of other-than-circular outline.

A frame 4 is provided and composed of a somewhat adhesive strongly elastically yieldable material, such as a synthetic plastic or the like of which many are known and suitable for this purpose, and which can be preferably cast or poured. In the illustrated embodiment this frame 4 is stepped as illustrated so that its major portion is located between the marginal circumferential portions of the plates 3, whereas projecting edges overlie the circumferential edge faces of the plates 3 in sealing engagement therewith. Of course a different configuration would also be possible. In any case, the marginal portions of the plates 3 and the outer edge face of the frame 4 are embraced by a retaining element 2 of substantially U-shaped cross-section which engages the plates 3 and presses them in sealing relationship inwardly into tight contact with the material of the frame 4. The outer peripheral edge face of the element 2 is reinforced by a reinforcing member 1, here shown as a steel strapping tape, and the entire construction in turn is surrounded by an outer frame 4'. The element 2 may consist of metallic material, it may be of synthetic plastic material, or it may be of glass fiber-reinforced synthetic plastic material. The outer frame 4' may be of synthetic plastic material but could also be made of another material.

Embedded in the material of the frame 4 are one or more units 6 which constitute the means for terminating the passage of light through the opening encircled by the frame 4 and across which the plates 3 extend. As shown in FIGS. 1 and 2, these units 6—of which one may be provided, or a larger number which will then be spaced circumferentially of the frame 4—have a shell 6a which may diverge in the manner evident from FIG. 2 towards an open side which communicates with the chamber defined between the plates 3 and the frame 4. Accommodated in the interior of the shell 6a is a charge of an opaquing material, here of carbon powder which is identified with reference numeral 8. The shell may consist of metallic material and embedded at its convergent side is an explosive charge 7 which is known per se from the prior art and which is embedded and retained by means of a suitable potting compound 10. Across the open side closed by shell 6a extends a web or skin 11 of a suitable lacquer, or a synthetic plastic material, such web being frangible and serving the purpose of retaining the powdered carbon in the shell 6a until the charge 7 is detonated. Electrical wires 7a (see FIG. 3) are connected with the charge 7 which is to be electrically detonated in well-known manner, and these wires are embedded in the frame 4 in accordance with a concept of the present invention. A connector 7a' (FIG. 3) may also be embedded and connected with the wires 7a, as illustrated. The units 6 are cast or embedded in the material of the frame 4 when the latter is made, and the plates 3 are then assembled to it with the axially projecting ridges of the frame 4 overlapping the edges faces of the plates 3 and extending to the outer surfaces 3' thereof. If desired or considered necessary, a coating 5 of rubber or a suitable adhesive may be placed between the frame and the cooperating marginal portions of the plates 3 to provide better sealing and adhesion. Now the retaining element 2 is placed about the partially assembled device; it serves to press the marginal portions of the plates 3 into tight sealing engagement with the frame 4. Once this is done, the steel tape 1 is placed about the outer edge face of the element 2 as shown in FIGS. 1 and 2, and for this purpose a simple strapping tool such as is used for the strapping of bales or commercial containers, can be employed. The tape 1 tightly engages the outer edge face of the element 2 and serves to reinforce the latter against explosive pressures which develop in the interior of the chamber of the device. Depending upon the magnitude of these pressures, however, the steel tape 1 can also be replaced with a tape of pretensioned rubber or similar elastomeric material.

Finally, an external frame 4' is placed about the element 2 and the reinforcing tape 1, and it may consist of metallic material, and synthetic plastic material, of a rubber-like material of glass fiber-reinforced synthetic plastic material.

It will be appreciated that the material 5 which may be employed as desired, as pointed out before, not only has the purpose of sealing the chamber against the escape of fluid, but also against the entry of undesirable substances. In particular, it is desirable to provide such a seal to preclude the intrusion of moisture which would deleteriously affect the hygroscopic carbon particles. The material 5 may be a rubber-based adhesive or any other suitable adhesive which is capable of providing a permanently elastic sealing function and avoids the necessity for additional rubber or other sealing elements.

In the embodiment of FIG. 3 we have shown that the shell 9a of one of the units 6 can diverge not only in one claim as shown in FIG. 1, but can conically diverge in two planes which are normal to one another, meaning that it can be substantially funnel-shaped in configuration. All other elements in FIG. 3 correspond to those of FIG. 1 and are identified with like reference numerals.

It is also possible according to an embodiment of the invention to admix with the material of the frame 4, for instance a synthetic plastic rubber, a substance which will impart electrical conductivity to the material of the frame 4, such as graphite. The purpose of this will be to prevent premature detonation of the charges 7 due to possible electrostatic charges.

A shutter according to the present invention can be made very rapidly, for instance in less than 30 minutes, and is thus inexpensive to produce. Added to this is the fact that its construction itself is basically simple and therefore inexpensive and that it requires less material than heretofore possible. Due to all of these factors, and also the less expensive and thinner plates 3 and the elimination of screw threaded connections, it is possible to produce and sell such a shutter at prices which amount to only about a tenth of the prices for the previously-known shutters of the type here under discussion, and which thus permit use of the novel shutter for a single time whereupon it is discarded.

Quite surprisingly it has been found that the ability of the novel shutter to yield under the influence of internal pressures developing upon detonation of the charges 7, makes it possible to use substantially stronger charges than in a conventional shutter of the type under discussion utilizing a metallic frame, assuming the conventional shutter and the one according to the present invention to have the same volumetric content of the chamber into which the carbon is to be injected. In fact, even with relatively strong charges which would cause a deformation of a metallic frame so that a thus constructed shutter would become unusable after a single instance of use, or which would possibly even lead to rupturing of the metal frame of a conventional shutter, a shutter according to the present invention can be reliably operated without danger. Tests have shown that for instance a shutter having a chamber volume of 80 cm$^3$ and constructed in accordance with the prior art, may be employed with at most three explosive charges each having 20 mg of explosive. If the shutter is constructed according to the present invention, and has the same volumetric content of its chamber, the charges which may be safely used may amount to a total of 120 – 180 mg of explosive, by contrast to the total of 60 mg which can be used with the prior-art shutter. It will be appreciated, of course, that the increased charges serve to blow the carbon-particle charges 8 into the chamber at increased speed, so that the time required for complete closing or opaquing of the shutter is reduced from the previous value of 80 $\mu$s to approximately 30 – 50 $\mu$s, a distinct advantage which also serves to open new fields of application for such shutters.

The electrical ignition impulse, which is for instance supplied by a capacitor discharge of 0.1 $\mu$F – 1 $\mu$F at a voltage of 200 – 300 V, may be supplied to the explosive charges 7, or rather to their wires 7a, in a simple manner by providing a conventional coaxial connector which is connected with the wires 7a and embedded in the material of the rubberlike frame 4, in such a manner that neither it nor the wires 7a project from the exterior of the frame 4. This avoids the possibility of danger to such components in case of rough handling or during the packaging. The use of a coaxial connector permits a rapid connection and disconnection from the external source of energy, and the connector can of course also be configured in such a manner that rotational movements are precluded, so that the connector may serve as a holding element for the entire shutter via the mating external connector which is coupled with the coaxial connector.

Shutters of the type here in question are frequently expected to stand very high radiation after they have been operated, that is after the carbon has been injected into their chamber to opaque or close the shutter. This is for instance true where the shutter is intended for viewing of nuclear explosions and must serve to protect the human eye against damage resulting from such explosions. In this case the shutter must be capable of closing or opaquing within 50 – 100 $\mu$s. However, even after it has done so the strong heat radiation wave which follows the initial light flash of a nuclear explosion will act upon the shutter with an energy which may amount to 10 cal/cm$^2$ per second. Under such circumstances plates made entirely of synthetic plastic material would become deformed and form bubbles or even melt and form holes so that despite the already opaque shutter, light or other radiation could possibly pass through shutter and cause damage to the human eye, notwithstanding the initial timely and proper opaquing of the shutter.

This problem can be avoided according to a further concept of the embodiment by resorting to the construction which by way of example is shown in FIG. 4. Here, at least that plate 3a which faces the incoming light and radiation is laminated, that is it is composed of at least two layers 3a' and 3a'' which are superimposed. According to the embodiment of FIG. 4 at least one of these layers 3a' and 3a'' is of a material which is capable of withstanding the thermal energy to be expected, whereas the other of these layers is of a material capable of withstanding the explosive pressures which develop when the charge or charges 7 are detonated. In FIG. 4 it will be assumed that it is the layer 3a which is the pressure-resistant material and the layer 3a', facing the interior of the chamber, which is resistant to the thermal energy, and they could be conceivably reversed. All other elements in FIG. 4 have reference numerals corresponding to those of like elements in the preceding Figures. Of course, the plate 3a could also be made of more than two layers, so that for instance a layer resistant to thermal radiation could be embedded between two layers resistant to pressure, or vice versa.

It is also possible to construct the shutter symmetrically in such a way that a plate 3a is mounted in the middle of the chamber corresponding to FIG. 4a. If the shutter is released, the carbon powder blows on both sides of the plate 3a so that four surfaces are entirely blackened.

This construction has the special advantage to be extremely resistant to heat radiation shock. If heat radiation of very high amount, e.g. 20 cal/sg. cm·s happens, the upper blackened sheet will be probably become deformed but under all circumstances the second half of this double chamber remains undestroyed. Therefore, during and after such a heat shock, the proper shutter function will remain.

It may be mentioned that for obtaining a tight good seal of long lived character, usual adhesives of one component character or multicomponent, too, can be applied between some or all above mentioned parts of the shutter which should be tightened against the outer atmosphere, e.g. against entering of water vapor.

It will be understood that each of the elements described above, or two or more together, may also find a useful application in other types of constructions differing from the types described above.

While the invention has been illustrated and described as embodied in a shutter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A shutter comprising a frame of resiliently yieldable elastomeric material bounding an opening for the passage of light; at least a pair of spaced apart at least substantially parallel transparent plates sealingly accommodated in said frame extending across said opening, said plates defining between themselves and with said frame a sealed internal chamber; and means for terminating the passage of light through said opening and said plates, said means comprising at least one unit accommodated in said frame and including a charge of carbon powder and injecting means operable for injecting said carbon powder at high speed into said chamber with concomitant development of internal pressure in the latter, resilient yielding of said frame in response to such development of internal pressure preventing venting of the chamber to the ambient atmosphere.

2. A shutter as defined in claim 1, wherein said frame consists at least predominantly of synthetic rubber.

3. A shutter as defined in claim 1, wherein said frame consists at least predominantly of silicone rubber.

4. A shutter as defined in claim 1, wherein said plates consist of synthetic plastic material.

5. A shutter as defined in claim 4, wherein said plates consist of Plexiglas.

6. A shutter as defined in claim 4, wherein said plates consist of Macrolon.

7. A shutter as defined in claim 1; wherein said injecting means comprises an electrically ignitable explosive charge.

8. A shutter as defined in claim 7; and further comprising electrical conductors embedded in said frame and connected with said explosive charge for connecting the same with a source of electrical energy.

9. A shutter as defined in claim 8; further comprising a connector also embedded in said frame and conductively connected with said electrical conductors, said connector being accessible at the exterior of said frame.

10. A shutter as defined in claim 1; and further comprising an electrically conductive additive in said elastomeric material of said frame.

11. A shutter as defined in claim 10, wherein said additive is graphite.

12. A shutter as defined in claim 1, said frame being of profiled cross-section and having circumferentially extending shoulders surrounding said opening and sealingly engaging the respective plates.

13. A shutter as defined in claim 1, said means further comprising a hollow shell having an open side facing and communicating with said chamber, said charge of carbon powder being accommodated in the interior of said shell; and a frangible web extending across said open side for retaining said carbon powder in said shell until operation of said injecting means.

14. A shutter as defined in claim 1, said means for terminating the passage of light further comprising at least one additional unit similar to the first-mentioned unit and also accommodated in said frame but circumferentially spaced from said first-mentioned unit.

15. A shutter comprising a frame of elastomeric material bounding an opening for the passage of light and having an outer circumferential marginal portion; at least two spaced apart at least substantially parallel transparent plates extending across said opening and defining between themselves an internal chamber; an annular retaining element of inwardly open U-shaped cross-section surrounding said frame and embracing said circumferential marginal portion in a sense urging said plates into sealing engagement with said frame; and means for terminating the passage of light through said opening, said means comprising at least one unit accommodated in said frame and including a charge of carbon powder and injecting means operable for injecting said carbon powder at high speed into said chamber.

16. A shutter as defined in claim 15, wherein said retaining element consists at least predominantly of metallic material.

17. A shutter as defined in claim 15, wherein said retaining element consists at least predominantly of synthetic plastic material.

18. A shutter as defined in claim 15, wherein said retaining element consists at least predominantly of glass-fiber reinforced synthetic plastic material.

19. A shutter as defined in claim 15, said retaining element having a circumferential edge face extending in at least substantial parallelism with the axis of said opening; and further comprising a reinforcing member encircling said retaining element and tightly engaging said edge face for reinforcing said element against outwardly directed forces liberated in said chamber in response to operation of said injecting means.

20. A shutter, comprising a frame of elastomeric material bounding an opening for the passage of light; at least three spaced apart parallel transparent plates sealingly accommodated in said frame, extending across said opening and defining between themselves at least two internal parallel chambers; and means for terminating the passage of light through said opening, said means comprising at least one unit embedded at least partially in said frame and including a charge of carbon powder and injecting means operable for simultaneously injecting some of said carbon powder at high speed into one of said chambers and the remainder of said carbon powder into the other of said chambers.

21. A shutter as defined in claim 20 wherein the middle plate is mounted symmetrically between the two other plates so that said carbon powder blackens four plates simultaneously.

22. A shutter, comprising a frame bounding an opening for the passage of light; at least two spaced apart substantially parallel transparent plates sealingly connected with said frame extending across said opening and defining between themselves an internal chamber, one of said plates normally facing the incoming light, and at least said one plate being of laminar construction and comprising at least one layer of a material highly resistant to heat and at least one additional layer resistant to and slightly yieldable under the influence of pressure; and means for terminating the passage of light through said opening, said means comprising at least one unit accommodated in said frame and including a charge of carbon powder and injecting means operable for injecting said carbon powder at high speed into said chamber.

* * * * *